United States Patent [19]

Daves

[11] Patent Number: 5,405,226
[45] Date of Patent: Apr. 11, 1995

[54] SECURING APPARATUS FOR CARGO LOAD LOCKS

[76] Inventor: James W. Daves, 1108 Monique Ave., Bakersfield, Calif. 93307

[21] Appl. No.: 104,710

[22] Filed: Aug. 12, 1993

[51] Int. Cl.⁶ .......................... E05B 73/00; B60P 7/12
[52] U.S. Cl. ..................................... 410/32; 410/156; 211/4; 248/552
[58] Field of Search ................................ 410/143–145, 410/149–152, 156, 31, 32, 42, 47; 211/8, 9, 60.1, 4; 248/551, 552, 201, 202.1, 203; 224/42.25, 42.45 R; 70/58

[56] References Cited

U.S. PATENT DOCUMENTS

| D.330,180 | 10/1992 | Daves . | |
|---|---|---|---|
| 1,712,869 | 5/1929 | Clark, Sr. . | |
| 2,454,473 | 11/1948 | Nampa | 410/156 |
| 3,278,149 | 10/1966 | Brucker . | |
| 3,831,892 | 8/1974 | Herman . | |
| 3,893,568 | 7/1975 | Lile . | |
| 4,063,646 | 12/1977 | Stahl, Jr. | 248/552 X |
| 4,662,805 | 5/1987 | Tamez et al. | 410/156 X |
| 4,723,880 | 2/1988 | Stumpf, Jr. . | |
| 4,756,504 | 7/1988 | Chamberlain . | |
| 4,782,624 | 11/1988 | Head . | |
| 4,869,377 | 9/1989 | Mercado . | |
| 5,037,256 | 12/1991 | Schroeder | 410/152 X |
| 5,052,601 | 10/1991 | Carter et al. . | |
| 5,060,810 | 10/1991 | Jones | 211/4 X |
| 5,085,326 | 2/1992 | Russell et al. | 211/4 |
| 5,287,972 | 2/1994 | Saathoff | 70/58 X |

FOREIGN PATENT DOCUMENTS 1333750  6/1963  France .
1093767  12/1967  United Kingdom .

Primary Examiner—Michael S. Huppert
Assistant Examiner—Stephen Gordon
Attorney, Agent, or Firm—Richard C. Litman

[57] ABSTRACT

An apparatus providing for the lockable securing of cargo load locks for the trucking industry is disclosed. Load locks comprising extendible, rigid elongate poles are installed laterally within trailers or vans to secure partial loads, and due to their portability are subject to loss or theft. The present invention is installable upon the exterior surface of the rear of a truck tractor cab, and comprises two opposed box-like structures having facing open sides. One of the structures is completely closed on all other sides when installed, requiring the end(s) of the load lock(s) to be inserted into the facing open side. The opposite structure includes an adjacent side opening into which the other end(s) of the load lock(s) may be inserted. The adjacent side opening may then be closed by a pivotable plate which locks in place with a single padlock to lock the end(s) of the load lock(s) within the two opposed boxes.

18 Claims, 2 Drawing Sheets

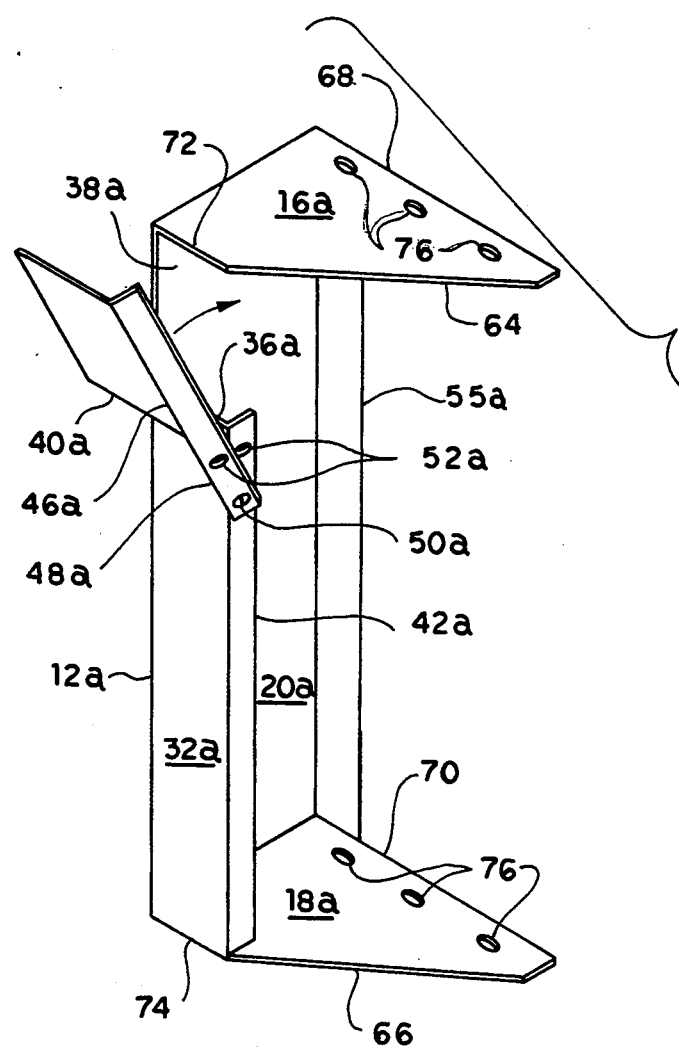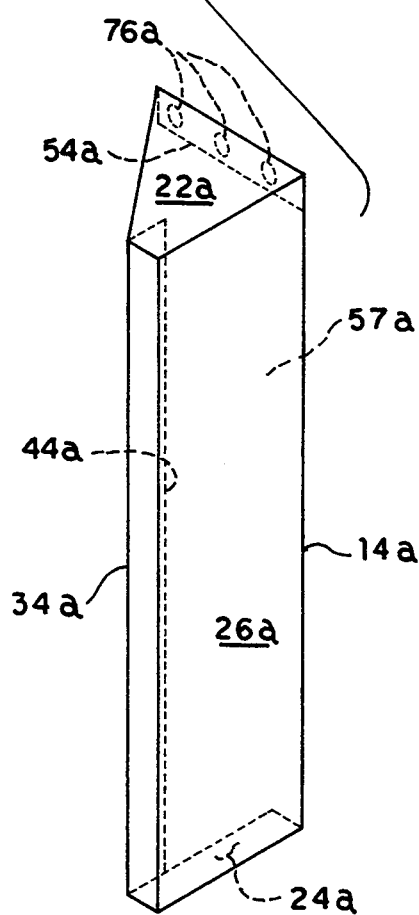
FIG. 2

SECURING APPARATUS FOR CARGO LOAD LOCKS

FIELD OF THE INVENTION

The present invention relates generally to locks and security devices, and more specifically to an apparatus providing for the lockable securing of cargo retainers or load locks on an exterior surface of a vehicle.

BACKGROUND OF THE INVENTION

Oftentimes in the trucking industry, an occasion arises when a partial load must be transported from one point to another. When only part of the total volume of a trailer or the van portion of a truck is filled, the load is subject to shifting into the unloaded portion of the volume due to vibration, acceleration, braking and turning forces, etc. On some occasions, the shift of cargo or freight can be so great as to create an unstable load and cause the truck and/or trailer to tip.

As a result, truckers generally use load locks to secure partial loads of cargo within a trailer or van. Load locks are elongated, extendible poles which may be installed transversely (or vertically in a covered space) between the walls of an enclosure and wedged therebetween, to prevent cargo or freight from shifting past the installed load locks. Normally, a trucker will carry two or more load locks with him or her when on a trip, in order to secure such cargo loads. When the load locks are not in use, they are often stored on the exterior of the back of the cab of the tractor, particularly in the event that the truck is "deadheading" with no attached trailer.

Most truckers find it convenient to wedge their load locks between the aerodynamic cab extenders immediately behind the rear of the tractor cab, if the tractor is so equipped. While this is convenient for the trucker. the lateral force of the load locks often spreads and damages the side extenders to the point that they require repair or replacement. which is not an inexpensive consideration for the trucking company or the independent trucker. Consequently, various racks or brackets have been developed for the storage of load locks on the exterior of the rear wall of a truck tractor cab.

However. such relatively lightweight and easily portable devices are subject to being readily moved from one truck or trailer to another and as a result it can be difficult for a trucker to retain a specific set of load locks for his/her vehicle. This is not generally a serious problem if the trucking company supplies such equipment. but since such devices are readily removable from the exterior of a truck or from an open trailer and are easily transportable. they are of course subject to theft. Accordingly many, if not most, trucking companies do not supply load locks and the drivers are forced to purchase their own. Securing such devices to the exterior of a tractor cab without any locking or securing means may prevent damage to the side extenders, but leaves the load locks vulnerable to theft.

The need arises for an apparatus providing for the lockable security and storage of cargo load locks on the exterior of a vehicle. The apparatus must provide complete lockable security for one or more load locks. yet must provide easy access to the load locks without the expenditure of undue time or effort on the part of the user of the apparatus. Moreover, the apparatus must be relatively inexpensive to purchase and install, and must be adaptable to various different makes and models of trucks, or other surfaces as may be desired.

DESCRIPTION OF THE PRIOR ART

U.S. Pat. No. 1,712,869 issued to James M. Clark, Sr. on May 14, 1929 discloses a Detachable Luggage Carrier attachable between the front bumper and grille or bodywork of an automobile. The device is not universally adaptable, considering the intergration of bumpers and bodywork on modern automobiles, and moreover is essentially nothing more than a tray with no further securing means disclosed for articles carried thereon.

U.S. Pat. No. 3,278,149 issued to Henry J. Brucker on Oct. 11, 1966 discloses a Shelving Assembly having a plurality of vertical and horizontal members which cooperate with specially formed attachments which provide support for crossmembers. The attachments do not secure to the wall itself, as in the case of the present invention, and no locking means for the crossmembers fitted therein is disclosed.

U.S. Pat. No. 3,831,892 issued to David M. Herman on Aug. 27, 1974 discloses a Jack Lock comprising plural brackets installable on a wall, as on the inner wall of a pickup truck box. The device is open ended, i.e., an elongate article could be removed by withdrawing it from one end, even with the securing brackets installed. A locking member must be installed through a passage in the jack itself, whereas the present invention surrounds the ends of the elongate member secured therein. Moreover, only a single article can be installed therein, unlike the plural capacity of the present invention.

U.S. Pat. No. 3,893,568 issued to William H. Lile on Jul. 8, 1975 discloses a Tool Holder installable in the box of a pickup truck. Again, the elongate tools can be withdrawn from the open end of the holder; the only retaining means is the tailgate structure of the pickup box. If the tailgate is opened, the tools may be removed from the holder even though the holder is locked.

U.S. Pat. No. 4,723,880 issued to Charles W. Stumpf, Jr. on Feb. 9, 1988 discloses a Shoring Beam Storage Rack for use in securing load locks (called shoring beams in the Stumpf, Jr. patent). The device operates similarly to the jack lock of the Herman patent discussed above. in that a padlock must be secured through the end of a tongue which is passed through a passage in the shoring beam. Moreover, only a single beam may be secured by the Stumpf. Jr. device, whereas the present invention provides for the storage of plural load locks.

U.S. Pat. No. 4,756,504 issued to Lewis W. Chamberlain on Jul. 12, 1988 discloses a Utility Locking Hook which may be used plurally to secure the ends of elongate articles. The device is open ended. however. which would allow any articles secured therein to be removed by withdrawing them from the end, unlike the present invention.

U.S. Patent No. 4,782,624 issued to James R. Head on Nov. 8, 1988 discloses a Fisherman's All Purpose Boat Mounted Stand, intended primarily for the storage of fishing rods. No locking means is disclosed, and moreover an article held therein may be withdrawn from the open upper end of the device, unlike the present invention.

U.S. Pat. No. 4,869,377 issued to David Mercado on Sep. 26, 1989 discloses a Storage Rack For Load Locks. The device uses a signal lock to secure plural load locks, but requires separate clamps for each load lock installed therein. Moreover, the device is open ended, as in the case of all of the other devices discussed herein; a load lock installed therein may be removed by withdrawing it from one end of the rack.

U.S. Pat. No. 5,052,601 issued to Ralph E. Carter et al. on Oct. 1, 1991 discloses a Truck-Mounted Rack For Cargo Holders. The device is installable upon various areas of the truck tractor or trailer, but again it is open ended and an elongate device could be withdrawn from one end of the rack. The only means for retaining such load locks or cargo holders within the rack, is by using some other components as end plates for the rack (e.g., the tractor cab side extenders) or by using cargo holders with relatively wide ends which cannot be withdrawn. The present invention provides for the storage of any configuration of rigid, elongate load lock(s) or other rigid, elongate article(s).

U.S. Des. Pat. No. 330,180 issued to applicant on Oct. 13, 1992 discloses a design for a Storage Kit For Cargo Load Locks. The design discloses means for securing the opposite ends of load locks therebetween. but no locking means is disclosed. Moreover, the diagonal configuration would require the load locks to be at least partially extended in order to extend from one bracket to the diagonally opposite bracket, unlike the present invention which provides for the storage of collapsed load locks.

French Patent No. 1,333,750 to Norbert E. P. Deroux and published on Jun. 24, 1963 discloses an interior baggage storage rack for use in truck cabs. The device comprises an open rack with hooks providing for the suspension of the rack from an overlying structure. No permanent installation is disclosed, nor is any means disclosed for locking an article therein.

Finally, British Patent No. 1,093,767 to Eric E. T. Sanders and published on Dec. 6, 1967 discloses Venetian-Blind Mounting Brackets having an open front and a hinged side plate securable by means of a slidable extension cooperating with a passage on an adjacent side. No locking means is disclosed, nor does the device appear to be adaptable for use in the environment of the present invention.

None of the above noted patents, taken either singly or in combination, are seen to disclose the specific arrangement of concepts disclosed by the present invention.

SUMMARY OF THE INVENTION

By the present invention, an improved securing apparatus for cargo load locks is disclosed.

Accordingly, one of the objects of the present invention is to provide an improved load lock securing apparatus which provides for securing one or more load locks with a single locking device.

Another of the objects of the present invention is to provide an improved load lock securing apparatus which is installable on the exterior wall of the rear of a truck tractor cab.

Yet another of the objects of the present invention is to provide an improved load lock securing apparatus which is adaptable for use to existing attachment points on a variety of different truck tractor cabs.

Still another of the objects of the present invention is to provide an improved load lock securing apparatus which includes two opposed members serving to secure the ends of one or more load locks therein.

A further object of the present invention is to provide an improved load lock securing apparatus in which one of the opposed members includes a signal open side and the other includes an oppositely spaced open side and a second lockable opening through which load locks may be inserted or withdrawn.

An additional object of the present invention is to provide an improved load lock securing apparatus which may be constructed of a variety of materials, such as aluminum, standard or stainless steel or relatively tough plastics of high density.

Another object of the present invention is to provide an improved load lock securing apparatus which precludes damage to the rear of a truck tractor cab upon which the apparatus is installed.

A final object of the present invention is to provide an improved load lock securing apparatus for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

FIG. 2 is a perspective view of opposed members of the present invention, with each member being a different embodiment due to the different mounting flange arrangements on each.

Similar reference characters denote corresponding features consistently throughout the several figures of the attached drawings.

DETAILED DESCRIPTION OF THE PREFERRED EMBODIMENTS

Figure 1:
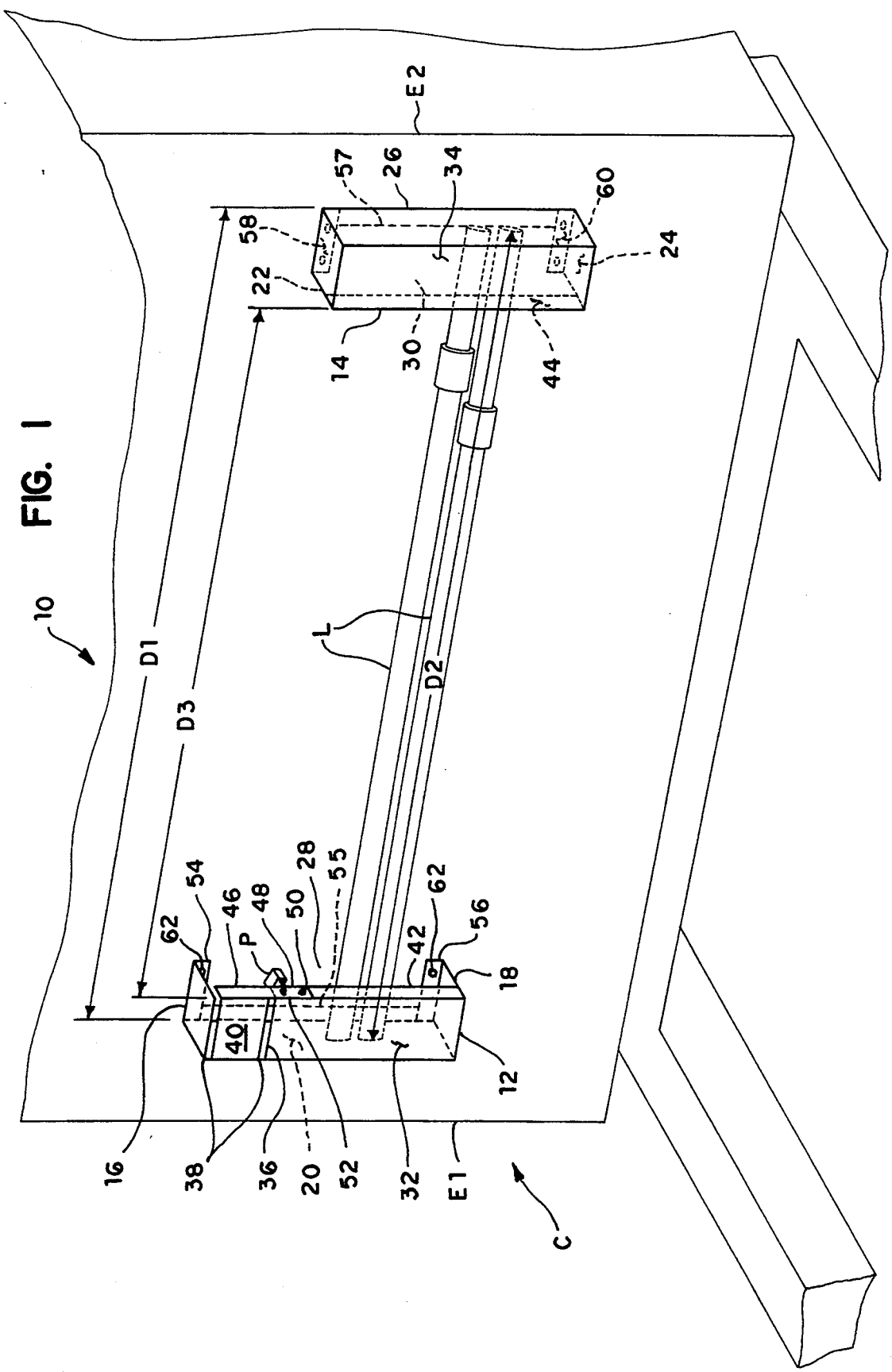
FIG. 1 is a perspective view of one embodiment of the present invention. showing its installation and use on the exterior of the rear wall of a truck tractor cab.

Referring now particularly to FIG. 1 of the drawings, the present invention will be seen to relate to an apparatus 10 for securing cargo load locks L to a wall, as to the exterior rear wall W of a truck tractor cab C. The load lock securing apparatus 10 of FIG. 1 comprises two spaced apart, oppositely installed enclosures 12 and 14, preferably installed respectively near the first and second edges E1 and E2 of the rear wall W of the cab C. Enclosures 12 and 14 are each essentially in the form of a hollow box, with each box having one open side: the wall W to which enclosures 12 and 14 are secured also serves as one of the sides of each of the enclosures 12 and 14.

The first enclosure 12 is defined by first and second spaced apart, opposite first and second end plates 16 and 18 with an outwardly facing interconnecting wall 20 therebetween. Second enclosure 14 includes equivalent spaced apart opposite first and second end plates 22 and 24, with an outwardly facing interconnecting wall 26 extending therebetween, as in the manner of the end plates and interconnecting wall 16, 18 and 20 of the first enclosure 12. However, it will be seen that the two enclosures 12 and 14 are installed with their outwardly facing walls 20 and 26 facing away from each other, and with an open side 28 of the first enclosure 12 and an open side 30 of the second enclosure 14 facing one another. The purpose of this arrangement will be explained in detail further below.

First and second enclosures 12 and 14 each further respectively include a cover 32 and 34, which covers 32 and 34 form the final closed sides of the two enclosures 12 and 14. While the cover 34 of the second enclosure 14 extends completely across the space between the first and second end plates 22 and 24 to connect those end plates 22 and 24 together in the manner of outwardly facing wall 26, cover 32 of the first enclosure 12 extends only partially thereacross, terminating at an edge 36 which is spaced apart from the first end 16. The space or opening 38 between the end 36 of the first enclosure cover 32 and the first enclosure first end 16 is selectively covered or closable by means of a pivotable locking plate 40.

Cover 32 includes a flange 42 extending partially into the open side 28; cover 34 may optionally include a like flange 44, as desired. While the flange 44 of the second enclosure may extend completely between the first and second ends 22 and 24, the flange 42 of the first enclosure extends only to the end 36 of the cover 32. Cover plate 40 includes a similar flange 46 having an extension 48, which extension 48 is pivotally secured to the flange 42 of the cover 32 by means of a fastener 50, e.g., pin, bolt, rivet, etc, which passes through cooperating passages (not shown for clarity) in the flange 42 and cover plate flange extension 48.

Additional cooperating lock passages 52 are formed in flange 42 and extension 48, which passages 52 provide for the locking closure of cover plate 40 when they are aligned. Once passages 52 are aligned, the cover plate 40 will be in coplanar alignment with the cover 32 of the first enclosure 12, essentially providing an unbroken cover comprising cover 32 and cover plate 40 extending from the first end plate 16 to the second end plate 18. Locking means, such as the hasp of a padlock P, may then be passed through the cooperating passages 52 and locked to preclude the unauthorized opening of the cover plate 40.

Preferably, the first and second enclosures 12 and 14 are installed on a wall W by means of mounting flanges 54, 56, 58, and 60 and fasteners 62 (e.g., bolts, rivets, etc.), with the opposite outwardly facing walls 20 and 26 spaced apart a slightly greater distance D1 than the minimum length D2 of the collapsed load locks L. Additional base flanges 55 and 57 may be included respectively along the lower edges of outwardly facing walls 20 and 26, and extending respectively between the mounting flanges 54 and 56, and flanges 58 and 60. As load locks L are extendible, they are also collapsible to a minimum length. One or more load locks L may then be placed within the first and second enclosures 12 and 14 by unlocking and opening the locking or cover plate 40 (if locked), placing one end of the load lock(s) L within the second enclosure 14 by means of the open side 30, and inserting the opposite end(s) of the load lock(s) L into the open space 38 provided when the cover or locking plate 40 is opened. The cover or locking plate 40 may then be secured by means of the lock hasp being passed through the aligned lock passages 52 to securely close the opening 38.

It will be seen that the distance D3 between the facing flanges 42 and 44 is somewhat less than the collapsed length D2 of the load lock L. Hence. any load locks L contained between the first and second enclosures 12 and 14 cannot be removed when locking cover plate 40 is locked in place, due to the wall W to which the first and second enclosures are secured; the opposite outwardly facing sides 20 and 26; the ends 16, 18, 22 and 24; and the two covers 32, 34 and the cover plate 40 of the two enclosures 12 and 14. Further, by providing sufficient depth between the edges of the covers 32 and 34 and the respective outwardly facing walls 20 and 26 of the first and second enclosures 12 and 14, and a sufficiently short span between the first and second ends 16, 18 and 22, 24. the diagonal dimension between opposite ends of the open sides 28 and 30 adjacent diagonally opposed ends 16, 24 and 18, 22 will also be shorter than the collapsed length D2 of load locks L or other similar articles secured by the present invention, thereby precluding the removal of those articles by manipulating one end diagonally opposite the other. Yet, the removal of any load locks L secured therein is easily accomplished by unlocking any lock means P used to secure the cover plate 40, pivoting the cover plate 40 outward to provide an opening 38, and withdrawing the end(s) of the load lock(s) L retained within the first enclosure 12. Once those end(s) are removed and clear of the outwardly facing wall 20, the opposite end(s) can be withdrawn from the open side 30 of the second enclosure 14.

FIG. 2 discloses alternative embodiments of the present invention. The two oppositely spaced apart enclosures 12a and 14a have essentially the same basic structure and provide essentially the same function as the two opposite enclosures 12 and 14 of FIG. 1. However, enclosures 12a and 14a include different shapes and/or arrangements of end plates and covers, in order to adapt to various types of truck tractors and their different provisions for the attachment of such enclosures and storage of load locks. While the two enclosures 12a and 14a of FIG. 2 have different arrangements of end plates and covers, it will be apparent that each of the enclosures may be provided with a "mirror image" enclosure (with the exception of the partial cover and openable cover plate on one of the two mirror image enclosures). The two different arrangements shown in FIG. 2 serve to show two of the variations possible in the present invention without resorting to an excessive number of drawing sheets and figures.

The first enclosure 12a of FIG. 2 will be seen to include generally the same components as the first enclosure 12 of FIG. 1, i.e., first and second ends 16a and 18a; an outwardly facing wall 20a and a cover 32a, with a gap or space 38a between the edge 36a of the cover 32a and the first end 16a; and a locking cover plate 40a having a flange 46a with an extension 48a which is secured to a cover flange 42a by means of a pivot 50a. Lock passages 52a are provided in the flange 42a and the cover plate flange extension 48a which, when aligned, ensure that the cover plate 40a and cover 32a are in coplanar alignment to close the space or opening 38a between the edge 36a of cover 32a and the first end 16a, in the manner discussed above for the first enclosure 12 of FIG. 1. The difference between the first enclosure 12 of FIG. 1 and the enclosure 12a of FIG. 2, is in the shape of the first and second ends. While the first and second ends 16 and 18 of the first enclosure 12 (and the first and second ends 22 and 24 of the second enclosure 14) are generally rectangular and provide an overall shape for the enclosures 12 and 14 which is that of a right parallelepiped or rectangular solid, the two ends 16a and 18a of the enclosure 12a of FIG. 2 each have truncated inwardly facing edges 64 and 66, with base edges 68 and 70 which are somewhat longer than the first and second end cover edges 72 and 74 which respectively meet with the locking cover plate 40a and the cover 32a. The two ends 16a and 18a may each further include a plurality of mounting or attachment holes 76 adjacent the two longer base edges 68 and 70, which attachment holes 76 provide for securing the enclosure 12a to another surface or brackets thereon. As in the case of the enclosures 12 and 14 of FIG. 1, enclosure 12a may include a flange 55a along the lower edge of the wall 20a and extending between the base edges 68 and 70 of the two ends 16a and 18a. A second enclosure (not shown) may be provided which is essentially a mirror image of enclosure 12a, with the exception of having a continuous, fixed cover in the manner of the cover 34 of the second enclosure 14 of FIG. 1.

The second enclosure 14a of FIG. 2 provides an additional variation on the embodiments discussed above. Enclosure 14a comprises first and second ends 22a and 24a, and an outwardly facing wall 26a and cover 34a each extending between the first and second ends 22a and 24a. The cover 34a may also include a flange 44a extending completely therealong, in the manner of the flange 44 of the second enclosure of FIG. 1, and a flange 57a along the lower edge of the wall 26a and extending between the two opposite ends 22a and 24a. The first end 22a of enclosure 14a has a form similar to that of the first and second ends 16a and 18a of enclosure 12a, and includes an attachment flange 54a with attachment holes 76a, in the manner of the attachment flange 54 of the first enclosure of FIG. 1 and the mounting or attachment holes 76 shown in the first enclosure 12a of FIG. 2. However, with certain installations, a full width second end including mounting or attachment means may not be necessary. In the case of the second enclosure 14a of FIG. 2, both the second end 24a and the cover 34a are relatively narrow, providing only sufficient width to preclude the withdrawing of a collapsed load lock L past the second end 24a and cover 34a. Thus, the second enclosure 14a of FIG. 2 will be seen to function in the same manner as the second enclosure 14 of FIG. 1. A first enclosure (not shown) having the same shape and general configuration as that of enclosure 14a may be provided, by shortening the length of the enclosure 34a and flange 44a and providing a cover plate with a cover plate flange and extension, in the manner of the first enclosures 12 and 12a of FIGS. 1 and 2. The restriction of removal of articles secured within any of the embodiments of the present invention by means of diagonally manipulating the articles within the first and second enclosures is still valid for each of the embodiments assuming that the dimensions of the critical features (cover and end width, cover length, and spacing between enclosures) is adjusted properly.

Thus. the various embodiments of the present invention provide for the secure and lockable storage of load locks and/or other relatively rigid, elongate articles by securing such locks and articles between first and second enclosures, with one of the enclosures including a closable and lockable opening. While a variety of materials may be used to construct any of the embodiments of the present invention, preferably a durable metal is used in order to provide resistance against damage due to attempted theft, wear and tear, etc. A relatively heavy gauge of aluminum is suitable, but other metals (e.g., standard or corrosion resistant steel) may be used, as well as certain plastics having relatively tough and durable qualities in a sufficiently heavy gauge.

It is to be understood that the present invention is not limited to the sole embodiment described above, but encompasses any and all embodiments within the scope of the following claims.

I claim:

1. A storage apparatus for lockably securing substantially laterally inflexible elongate articles on an attachment wall, said storage apparatus comprising:

a first enclosure having first and second opposed end plates, an outwardly facing enclosure wall therebetween, and an enclosure cover adjoining said enclosure wall and extending from said second end plate toward said first end plate and having an edge spaced apart from said first end plate to define an access opening therebetween;

said first enclosure further including an openable and lockably securable cover plate providing for the lockable closure of said access opening between said cover edge and said first end plate;

a second enclosure having first and second opposed end plates, an outwardly facing enclosure wall therebetween, and an enclosure cover adjoining said enclosure wall of said second enclosure and extending from said first end plate of said second enclosure to said second end plate of said second enclosure;

each said first and second end plates of said first enclosure and said second enclosure are substantially rectangular, and said first enclosure and said second enclosure are in the form of a substantially rectangular solid; and means providing for spaced apart and oppositely facing attachment of said first enclosure and said second enclosure to an attachment wall to define two spaced apart and facing openings, a distance therebetween, and a distance between said outwardly facing enclosure wall of said first enclosure and said outwardly facing enclosure wall of said second enclosure;

one of said facing openings defined by said first and second opposed end plates, said outwardly facing enclosure wall, said cover, and said cover plate of said first enclosure and the attachment wall; and, the other of said facing openings defined by said first and second opposed end plates, said outwardly facing enclosure wall, and said cover of said second enclosure and the attachment wall; whereby said lockable cover plate may be opened to provide access to said access opening such that an end of at least one elongate article may be installed within said second substantially rectangular enclosure by means of said facing opening of said second substantially rectangular enclosure, and an opposite end of said at least one elongate article may be installed within said first substantially rectangular enclosure by means of said access opening, and said access opening being lockably securable by means of said lockable cover plate, whereby said at least one elongate article may be lockably secured within said first and second substantially rectangular enclosures.

2. The storage apparatus of claim 1 including:

a first enclosure flange extending from said cover, of said first enclosure and partially covering said opening of said first enclosure;

a flange extending from said cover plate and including an extension therefrom, said cover plate flange extension being pivotally attached to said first enclosure flange;

said first enclosure flange and said cover plate flange each including a passage therethrough with said passages being concentric when said cover plate is in a closed position; whereby, said first enclosure access opening is lockably secured by closing said cover plate and passing a lock through said concentric passages of said first enclosure flange and said cover plate flange extension.

3. The storage apparatus of claim 1 including:

locking means providing for the lockable closure and securing of said cover plate to lockably secure said access opening.

4. A storage apparatus for lockably securing of substantially laterally inflexible elongate articles on an attachment wall, said storage apparatus comprising:

a first enclosure having first and second opposed end plates, an outwardly facing enclosure wall therebetween, and an enclosure cover adjoining said enclosure wall extending from said second end. plate toward said first end plate, and having an edge spaced apart from said first end plate to define an access opening therebetween;

said first enclosure further including an openable and lockably securable cover plate providing for the lockable closure of said access opening between said cover edge and said first end plate;

a second enclosure having first and second opposed end plates, an outwardly facing enclosure wall therebetween, an enclosure cover adjoining said enclosure wall of said second enclosure and extending from said first end plate of said second enclosure to said second end plate of said second enclosure;

each said first and second end plates of said first enclosure and said second enclosure are truncated with each said first and second end plates having a relatively wide base edge and a relatively narrow cover edge;

means providing for spaced apart and oppositely facing attachment of said first enclosure and said second enclosure to an attachment wall to define two spaced apart and facing openings, a distance therebetween, and a distance between said outwardly facing enclosure wall of said first enclosure and said outwardly facing enclosure wall of said second enclosure;

one of said facing openings defined by said first and second opposed end plates, said outwardly facing enclosure wall, said cover, and said cover plate of said first enclosure, and the attachment wall; and, the other of said facing openings defined by said first and second opposed end plates, said outwardly facing enclosure wall, and said cover of said second enclosure and the attachment wall; whereby said lockable cover plate may be opened to provide access to said access opening such that an end of at least one elongate article may be installed within said second substantially rectangular enclosure by means of said facing opening of said second substantially rectangular enclosure, and an opposite end of said at least one elongate article may be installed within said first substantially rectangular enclosure by means of said access opening, and said access opening being lockably securable by means of said lockable cover plate, whereby said at least one elongate article may be lockably secured within said first and second substantially rectangular enclosures.

5. The storage apparatus of claim 1 wherein:

each said first end plate of said first enclosure and said second enclosure are truncated with each having a relatively wide base edge and a relatively narrow cover edge; and, each said second end plate of said first enclosure and said second enclosure has a width equal to that of said first enclosure and said second enclosure covers respectively.

6. The storage apparatus of claim 1 including:

attachment means comprising flanges extending from at least one said end plate of said first and said second substantially rectangular enclosures.

7. The storage apparatus of claim 1 wherein:

said first enclosure and said second enclosure are formed of aluminum.

8. The storage apparatus of claim 1 wherein:

said first enclosure and said second enclosure are formed of steel.

9. In combination with an axially extendible and compressible load lock means having a minimum compressible length and opposed ends, a storage apparatus for the lockable securing of said load lock means on an attachment wall, said storage apparatus comprising:

a first enclosure having first and second opposed end plates, an outwardly facing enclosure wall therebetween, an enclosure cover adjoining said enclosure wall extending from said second end plate toward said first end plate, and having an edge spaced apart from said first end plate to define an access opening therebetween;

said first enclosure further including an openable and lockably securable cover plate providing for the lockable closure of said access opening between said cover edge and said first end plate;

a second enclosure having first and second opposed end plates, an outwardly facing enclosure wall therebetween, and an enclosure cover adjoining said enclosure wall of said second enclosure and extending from said first end plate of said second enclosure to said second plate of said second enclosure;

means providing for spaced apart and oppositely facing attachment of said first enclosure and said second enclosure to an attachment wall, and thereby defining two spaced apart and facing openings, a distance therebetween, and a distance between said outwardly facing enclosure wall of said first enclosure and said outwardly facing enclosure wall of said second enclosure with said distance between said openings being less than said minimum compressible length of said load lock means, and said distance between said enclosure walls being greater than said minimum compressible length of said load lock means;

one of said facing openings defined by said first and second opposed end plates, said outwardly facing enclosure wall, said cover, and said cover plate of said first enclosure, and the attachment wall; and, the other of said facing openings defined by said first and second opposed end plates, said outwardly facing enclosure wall, and said cover of said second enclosure, and the attachment wall; whereby, said lockable cover plate may be opened to provide access to said access opening, such that one of said ends of said load lock means may be installed within said second enclosure by means of said facing opening of said second enclosure, the other of said ends of said load lock means may be installed within said first enclosure by means of said access opening, and said access opening may be lockably secured by means of said lockable cover plate, whereby said load lock means may be lockably secured within said first and second enclosures.

10. The storage apparatus of claim 9 wherein:
said load lock means comprises a plurality of load locks.

11. The storage apparatus of claim 9 including:
a first enclosure flange extending from said cover of said first enclosure and partially covering said opening of said first enclosure;
a flange extending from said cover plate and including an extension therefrom, said cover plate flange extension being pivotally attached to said first enclosure flange; and
said first enclosure flange and said cover plate flange each including a passage therethrough, with said passages being concentric when said cover plate is in a closed position; whereby,
said first enclosure access opening is lockably closed and secured by closing said cover plate and passing a lock through said concentric passages of said first enclosure flange and said cover plate flange extension.

12. The storage apparatus of claim 9 including:
locking means providing for the lockable closure and securing of said cover plate to lockably secure said access opening.

13. The storage apparatus of claim 9 wherein:
each said first and second end plates of said first enclosure and said second enclosure are rectangular, and said first enclosure and said second enclosure are each in the form of a rectangular solid.

14. The storage apparatus of claim 9 wherein:
each said first and second end plates of said first enclosure and said second enclosure are truncated with each having a relatively wide base edge and a relatively narrow cover edge.

15. The storage apparatus of claim 9 wherein:
each said first end plate of said first enclosure and said second enclosure are truncated with each having a relatively wide base edge and a relatively narrow cover edge; and,
each said second end plate of said first enclosure and said second enclosure has a width equal to that of said first enclosure and said second enclosure covers respectively.

16. The storage apparatus of claim 9 including:
attachment means comprising flanges extending from at least one said end plate of said first and said second enclosures.

17. The storage apparatus of claim 9 wherein:
said first enclosure and said second enclosure are formed of aluminum.

18. The storage apparatus of claim 9 wherein:
said first enclosure and said second enclosure are formed of steel.

* * * * *